(12) United States Patent
Noh et al.

(10) Patent No.: US 9,413,027 B2
(45) Date of Patent: Aug. 9, 2016

(54) FUEL CELL SYSTEM AND THE OPERATING METHOD THEREOF

(71) Applicant: Hyundai Motor Company, Seoul (KR)

(72) Inventors: Yong Gyu Noh, Gyeonggi-do (KR); Dong Jo Oh, Gyeonggi-do (KR); Bu Kil Kwon, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 241 days.

(21) Appl. No.: 14/143,151

(22) Filed: Dec. 30, 2013

(65) Prior Publication Data

US 2014/0287334 A1 Sep. 25, 2014

(30) Foreign Application Priority Data

Mar. 19, 2013 (KR) ........................ 10-2013-0029325

(51) Int. Cl.
*H01M 8/04* (2016.01)
*H01M 8/24* (2016.01)

(52) U.S. Cl.
CPC ........ *H01M 8/2465* (2013.01); *H01M 8/04179* (2013.01); *H01M 8/04223* (2013.01); *H01M 8/04231* (2013.01); *H01M 8/04753* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 2006/0046106 A1* | 3/2006 | Yu | H01M 8/04231 429/414 |
| 2011/0065012 A1* | 3/2011 | Kwon | H01M 8/04253 429/429 |

FOREIGN PATENT DOCUMENTS

| | | |
|---|---|---|
| JP | 64-9360 | 1/1989 |
| JP | 2006-032328 A | 2/2006 |
| JP | 4590184 B2 | 12/2010 |
| JP | 2011-175946 A | 9/2011 |
| JP | 2012-216474 A | 11/2012 |
| KR | 10-2009-0057145 A | 6/2009 |
| KR | 2012-0053270 | 5/2012 |
| WO | 2010/100872 A1 | 9/2010 |

\* cited by examiner

*Primary Examiner* — Patrick Ryan
*Assistant Examiner* — Wyatt McConnell
(74) *Attorney, Agent, or Firm* — Mintz Levin Cohn Ferris Glovsky and Popeo, P.C.; Peter F. Corless

(57) ABSTRACT

A fuel cell system includes an air manifold through which air is supplied or exhausted, a fuel gas manifold through which fuel gas is supplied or exhausted, a stack portion that generates electricity by using air and fuel that are supplied by the air manifold and the fuel gas manifold, and an injection array that is disposed along an inside of the air manifold or the fuel gas manifold to inject air or fuel gas.

12 Claims, 16 Drawing Sheets

FUEL CELL SYSTEM AND THE OPERATING METHOD THEREOF

CROSS-REFERENCE TO RELATED APPLICATION

This application claims priority to and the benefit of Korean Patent Application No. 10-2013-0029325 filed in the Korean Intellectual Property Office on Mar. 19, 2013, the entire contents of which are incorporated herein by reference.

BACKGROUND (a) Field of the Invention

The present invention relates to a fuel cell system in which air is supplied to a cathode and hydrogen is supplied to an anode and the air is reacted with the hydrogen to generate electricity, and an operating method thereof.

(b) Description of the Related Art

A fuel cell uses electrochemical reaction of generally oxygen in air and hydrogen as fuel gas to generate electricity, and water is generated as a byproduct. The water that is generated in an electrode helps adjust the relative humidity (RH) of a membrane, but clogs the pores of a GDL (gas diffusion layer) or an electrode which in turn prevents air from being transferred to the electrode.

In some instances, when water is not appropriately eliminated and an excessive amount of water resides in electrodes and a channel/GDL a phenomena occurs called "flooding". Flooding disturbs the transmission of air and hydrogen and the performance of a specific cell is suddenly deteriorated thus lowering overall performance of fuel cells.

In a stack portion of a fuel cell within a fuel cell vehicle, many unit cells are connected in series to generate a higher voltage, and if one cell is deteriorated, the performance of the fuel cell is limited by characteristics of the series connection of the unit cells. That is, if the flooding occurs, a driver can feel performance deterioration or a loss of power from the vehicle.

Generally, when the flooding phenomenon occurs in a fuel cell vehicle, the air flow is increased to eliminate/evaporate the water. However, when the air flow amount is increased, the power consumption is also increased and the membrane can become dry which can deteriorate the durability of the membrane, and therefore it is desirable to prevent the flooding beforehand so that such large amounts of air do not need to be applied. This flooding can be caused by nonuniform air supply rather than a shortage of overall air supply amount, and therefore the uniform air supply is an important factor so as to prevent localized flooding.

FIG. 1 is a schematic diagram of a fuel cell system. Referring to FIG. 1, a fuel cell system includes a fuel cell 200, the fuel cell 200 includes a cathode 130, an anode 160, and a cooling channel 180, and air is supplied to the cathode 130 through a filter 100, a muffler 105, an air compressor 110, an intercooler 115, and a humidifier 120 in that order. Foreign material/water within the line is then exhausted through an exhaust valve 135.

The hydrogen is supplied to the anode 160 through a hydrogen supply valve 150 and an ejector 155. One part of the gas including hydrogen that is exhausted from the anode 160 is recirculated to the anode 160 by a recirculation blower through a reservoir 165 and the ejector 155, and the other part thereof is exhausted to the outside through a purge valve 170 and a drain valve 175.

The coolant is supplied to the cooling channel 180 through a coolant reservoir 185, a radiator 190, and a 3-way valve 195, and the coolant that is exhausted from the cooling channel 180 is distributed to the 3-way valve 195 and the radiator 190 through a water pump 197.

In the fuel cell 200, the hydrogen that is supplied to the anode 160 chemically reacts with the air that is supplied to the cathode 130 to generate electrical energy, and heat that is generated by this reaction is exhausted to the outside through the coolant. Meanwhile, the hydrogen and air are non-uniformly supplied to the anode 160 and the cathode 130, and this non-uniformity causes a localized flooding phenomenon to deteriorate overall electricity generation stability.

Further, if the rotational speed of the blower (e.g., an air compressor) is increased to increase the air supply amount in a high power mode, the fuel cell efficiency is deteriorated and the overall durability can be reduced. Also, if hydrogen or air is non-uniformly supplied to the anode or the cathode, the localized flooding phenomenon can increase the load of the air compressor, and the durability of the stack portion can be deteriorated when the fuel cell is not operated for a long time and the fuel cell is started.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a fuel cell system and an operating method thereof having advantages of uniformly supplying hydrogen or air to an anode or a cathode to reduce a flow rate differential, eliminate water that is locally formed therein, improve electrical generation stability, and securely maintaining operation of an air blower.

Also, the present invention has been made in an effort to provide a fuel cell system and an operating method thereof that maintains the operating load of an air compressor (blower) or a recirculation blower at a predetermined minimum level, prevent deterioration of overall durability while the fuel cell is not operated for a predetermined time, and suppress the generation of high voltage during starting thereof to improve overall durability.

A fuel cell system according to an exemplary embodiment of the present invention may include an air manifold through which air s supplied or exhausted, a fuel gas manifold through which fuel gas is supplied or exhausted, a stack portion that generates electricity by using air and fuel that are supplied by the air manifold and the fuel gas manifold, and an injection array that is disposed along an inside of the air manifold or the fuel gas manifold to inject air or fuel gas.

Nozzles of the injection array in some exemplary embodiments of the present invention may have a predetermined shape, and may be arranged with a predetermined distance therebetween. The injection array may be inserted into the air manifold, and as a result, air may be supplied through an inlet of the air manifold and through the injection array.

Likewise, an injection array may be inserted into the fuel gas manifold and as a result, fuel gas may be supplied through an inlet of the fuel gas manifold and through the injection array.

As such, fuel gas or air may be supplied through both a first and a second end portion of the injection array. The nozzles of the injection array may be arranged in at least two rows, and may have a slot shape that is continuously formed in a length direction.

Additionally, a fuel cell system according to an exemplary embodiment of the present invention may include an air manifold through which air is supplied or exhausted, a fuel gas manifold through which fuel gas is supplied or exhausted, a stack portion that is configured to generate electricity by using air and fuel gas that are supplied from the air manifold and the fuel gas manifold, an injection array that is disposed along an inside of the air manifold or the fuel gas manifold and in which a nozzle is formed to inject air or fuel gas, and a controller that is configured to control the operation of the stack portion and the air or fuel gas that is supplied through the air manifold, the fuel gas manifold, and the injection array, respectively.

The controller may supply the injection array that is disposed in the air manifold with dry air that does not pass through a humidifier and supplies the injection array that is disposed in the fuel gas manifold with dry fuel gas that does not pass through an ejector if a shut-down process is being performed to stop the operation of the stack portion.

The controller may supply the injection ay that is disposed in the fuel gas manifold with a predetermined amount of hydrogen, if it is determined by the controller that the stack portion maintains a "starting off" condition in which a voltage is not generated for a predetermined time. Additionally, the controller may supply the injection array that is disposed in the air manifold with a predetermined amount of hydrogen, if a starting signal is detected in a starting off condition in which the stack portion does not generate voltage.

A fuel cell operating method according to an exemplary embodiment of the present invention may include supplying air or fuel gas in a predetermined minimum load, determining, by a controller, whether a condition of each cell is satisfied or not through detection/monitoring of a voltage that is outputted from each cell of a stack portion, supplying air or fuel gas through an injection array with a predetermined minimum load if the controller determines that the condition of each cell is satisfied, and increasing air or fuel gas supply amount that is supplied to the injection array if it is determined that the condition of each cell is not satisfied.

In some exemplary embodiments of the present invention, the air supply load of an air compressor may be increased, a hydrogen purge valve may be operated, or an operation load of a recirculation blower may be increased, if the condition of each cell is not satisfied after the supply amount of air or fuel gas that is supplied to the injection array is increased.

As described above, the fuel cell system according to an exemplary embodiment of the present invention uniformly supplies hydrogen or air through a nozzle of an injection array to reduce an overall flow rate differential, has high pressure gas injected through the nozzle to eliminate water that is locally formed to improve the electrical generation stability, and securely maintains the operation of an air blower or an air compressor. Also, air or hydrogen may be directly supplied to a channel of a cell through an injection array so that the load on the air compressor or the recirculation blower is maintained at a predetermined minimum level.

Further, air that does not pass through the humidifier may be supplied to a cell of a stack portion as a pulse through an injection array for a shutdown logic to be able to effectively eliminate water. Also, a small amount of hydrogen may be supplied to an anode and a cathode through an injection array while a fuel cell is not being operated for a longer than a predetermined time to be able to improve overall durability. In addition, a small amount of hydrogen is supplied through an injection array before an air compressor (blower) is operated for the starting of a fuel cell so that generation of a higher than necessary voltage is suppressed to improve overall durability of the cell.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid fuel cell vehicles, electric, fuel cell vehicles, plug-in hybrid electric, fuel cell vehicles, hydrogen-powered fuel cell vehicles, and other alternative fuel vehicles. As referred to herein, a hybrid vehicle is a vehicle that has two or more sources of power, for example both fuel cell powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings.

Figure 1:
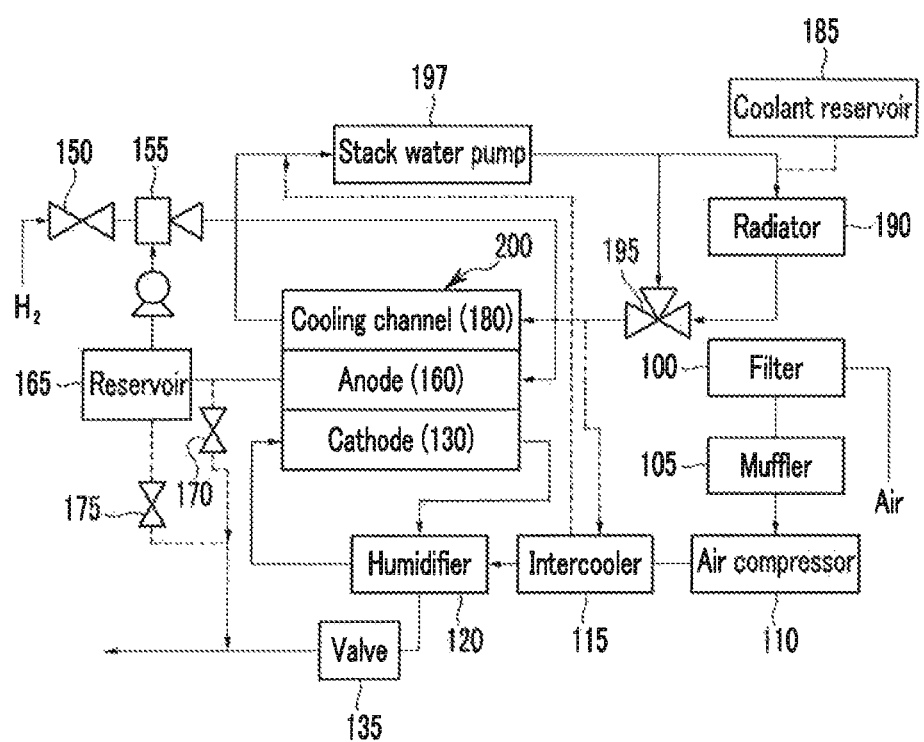
FIG. 1 is a schematic diagram of a fuel cell system.
Figure 2:
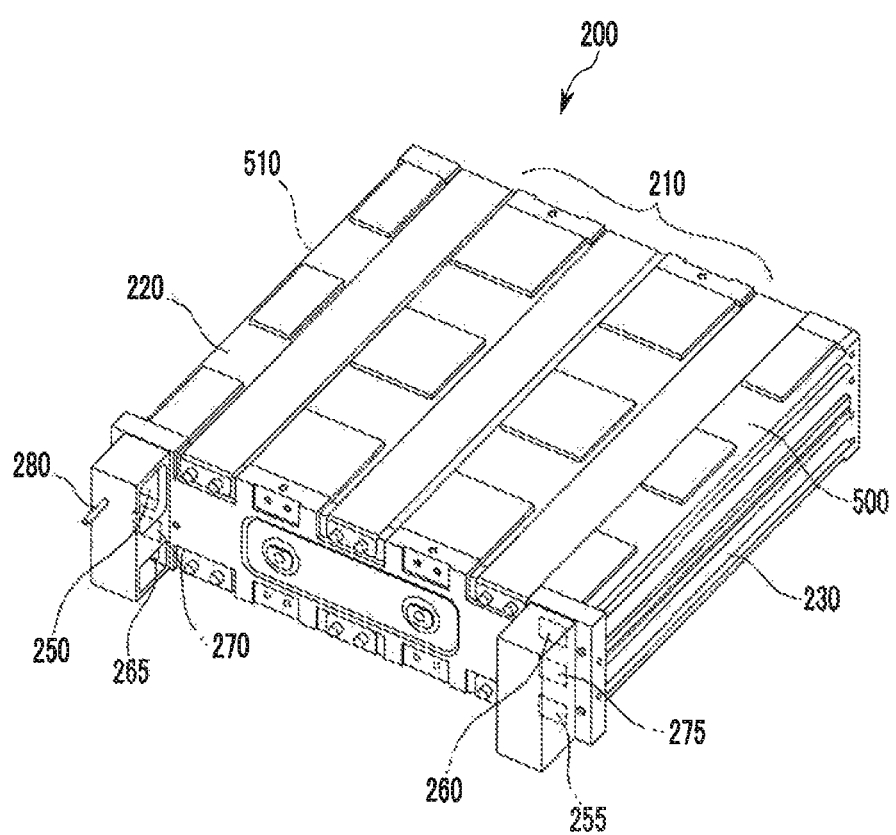
FIG. 2 is a perspective view of a fuel cell in a fuel cell system according to an exemplary embodiment of the present invention.

FIG. 2 is a perspective view of a fuel cell in a fuel cell system according to an exemplary embodiment of the present invention. Referring to FIG. 2, the fuel cell 200 includes a stack portion 210 of a middle portion, an air supply manifold 220, an air exhaust manifold 230, a fuel gas supply manifold 500, a fuel gas exhaust manifold 510, an air inlet 250, an air outlet 255, a hydrogen inlet 260, a hydrogen outlet 265, a coolant inlet 270, and a coolant outlet 275.

As shown in the drawings, an injection array 280 penetrates the air inlet 250 to be inserted into the air supply manifold 220. More specifically, air or hydrogen as a fuel gas can be supplied to the injection array 280 through a separate supply pipe.

Figure 3:
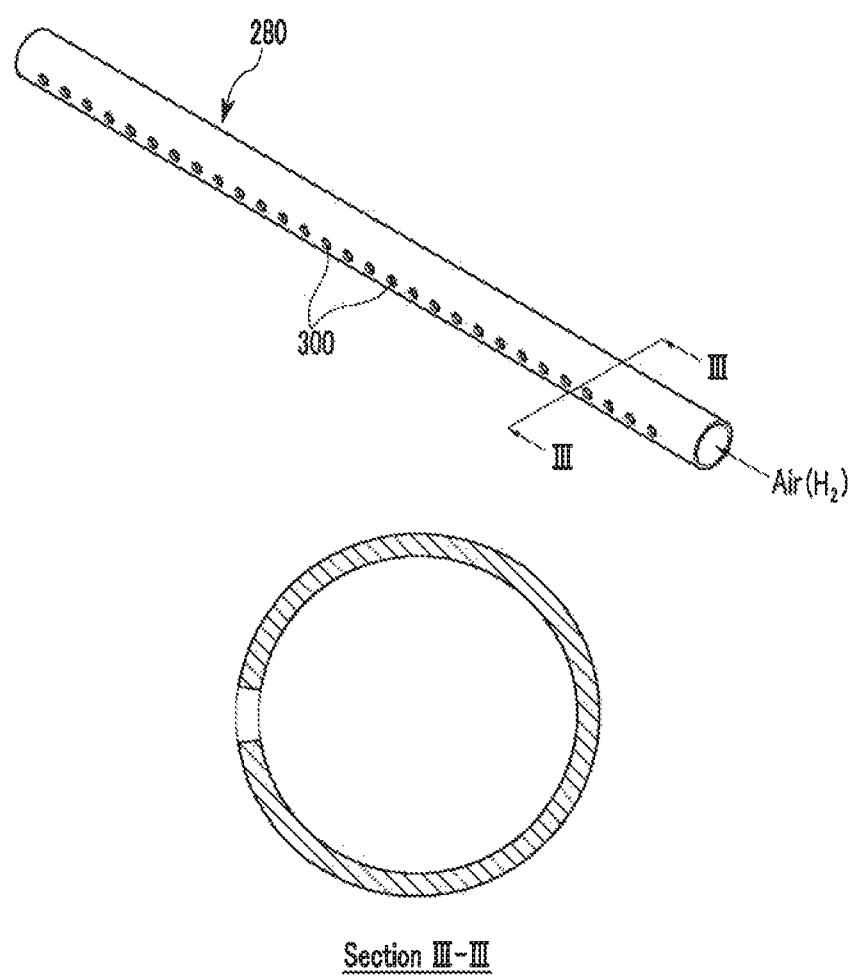
FIG. 3 is a perspective view and a cross-sectional view of an injection array in a fuel cell system according to an exemplary embodiment of the present invention.

FIG. 3 is a perspective view and a cross-sectional view of an injection array in a fuel cell system according to an exemplary embodiment of the present invention. Referring to FIG. 3, the injection array 280 has a pipe structure, one end thereof receives air or hydrogen, and nozzles 300 are formed at the side thereof.

The nozzles 300 may have a circular injection outlet shape, and they may be arranged along the injection array 280 at a predetermined distance from each other. The nozzles 300 of the injection array 280 may also be formed toward the stack portion 210 accordingly.

Air or hydrogen may be directly injected into the stack portion 210 through the nozzles 300 of the injection array 280. In particular, water that is formed in the stack portion 210 is effectively eliminated via the jet flow of the nozzle and simultaneously air or hydrogen is uniformly supplied to the stack portion 210 such that the overall efficiency of electricity generation is improved.

Further, air or hydrogen as a fuel gas that is injected through the injection array may exhaust water causing flooding. This eliminates parasitic power loss and abnormal cell operation as a result. Further, when air or fuel gas is supplied at a predetermined minimum level, the operation consumption power is reduced and overall electricity generation efficiency is improved.

Figure 4:
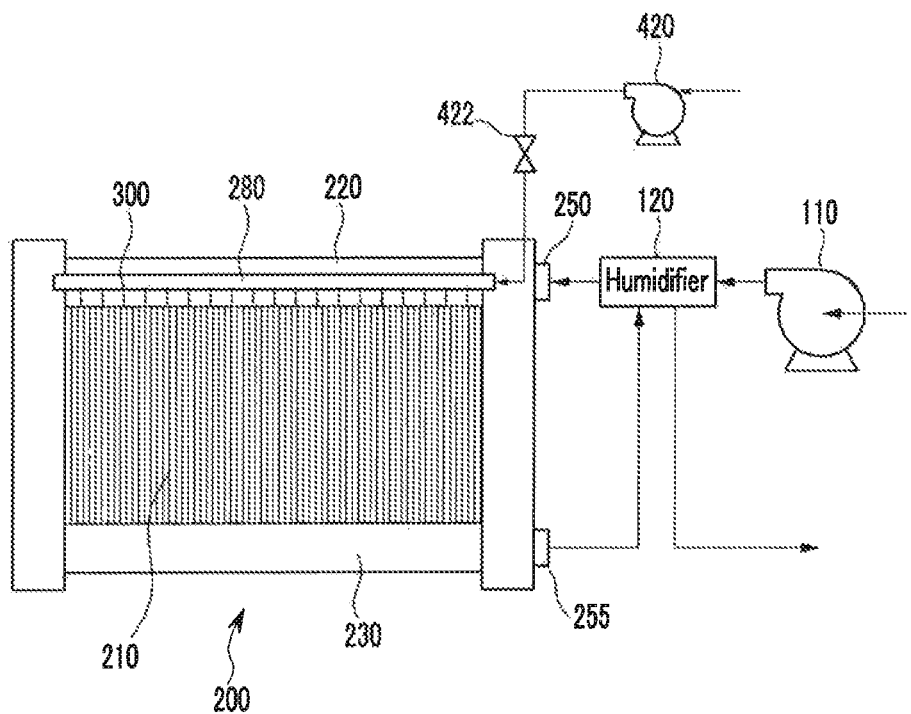
FIG. 4 is a partial schematic diagram of a fuel cell system according to a first exemplary embodiment of the present invention.

FIG. 4 is a partial schematic diagram of a fuel cell system according to a first exemplary embodiment of the present invention. Referring to FIG. 4, a fuel cell system includes a fuel cell 200, a humidifier 120, an air compressor 110, and an air injection compressor 420, and the fuel cell 200 includes an air inlet 250, an air supply manifold 220, a stack portion 210, an air exhaust manifold 230, an air outlet 255, and an injection array 280.

In the exemplary embodiment of the present invention, air is supplied to the stack portion through the air compressor 110, the humidifier 120, the air inlet 250, and the air supply manifold 220, and air is exhausted through the air exhaust manifold 230 and the air outlet 255. The injection array 280 may be inserted into the air supply manifold 220 through one side of the air inlet 250 and is disposed so that the nozzles 300 face the stack portion 210. Furthermore, one end portion that corresponds to the air inlet 250 on the injection array 280 may be connected to the air injection compressor 420 to receive separate air from the air injection compressor 420.

Figure 5A:
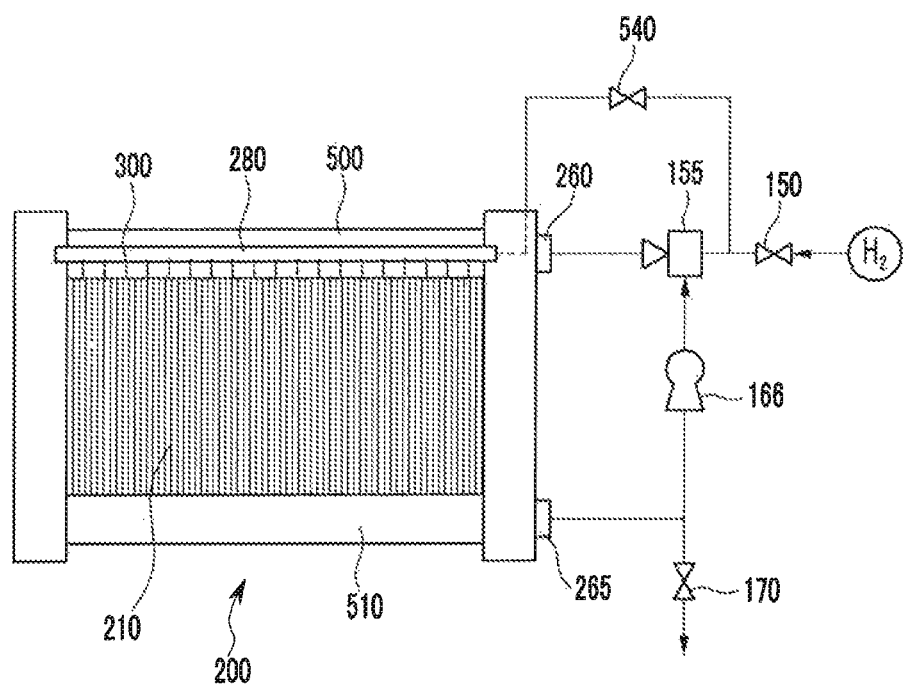
FIG. 5A is a partial schematic diagram of a fuel cell system according to a second exemplary embodiment of the present invention.

FIG. 5A is a partial schematic diagram of a fuel cell system according to a second exemplary embodiment of the present invention. Referring to FIG. 5A, a fuel cell system includes a fuel cell 200, a hydrogen supply valve 150, an ejector 155, and a hydrogen injection supply valve 540. The fuel cell 200 may include a hydrogen inlet 260, a fuel gas supply manifold 500, a stack portion 210, a fuel gas exhaust manifold 510, a hydrogen outlet 265, and an injection array 280.

This hydrogen may be supplied to the stack portion 210 through the hydrogen supply valve 150, the ejector 155, the hydrogen inlet 260, and the fuel gas supply manifold 500, and may be exhausted through the fuel gas exhaust manifold 510 and the hydrogen outlet 265.

The injection array 280 in the exemplary embodiment of the present invention is inserted into the fuel gas supply manifold 500 through the hydrogen inlet 260, and the nozzles 300 of the injection array 280 may be disposed to face the stack portion 210.

Figure 5B:
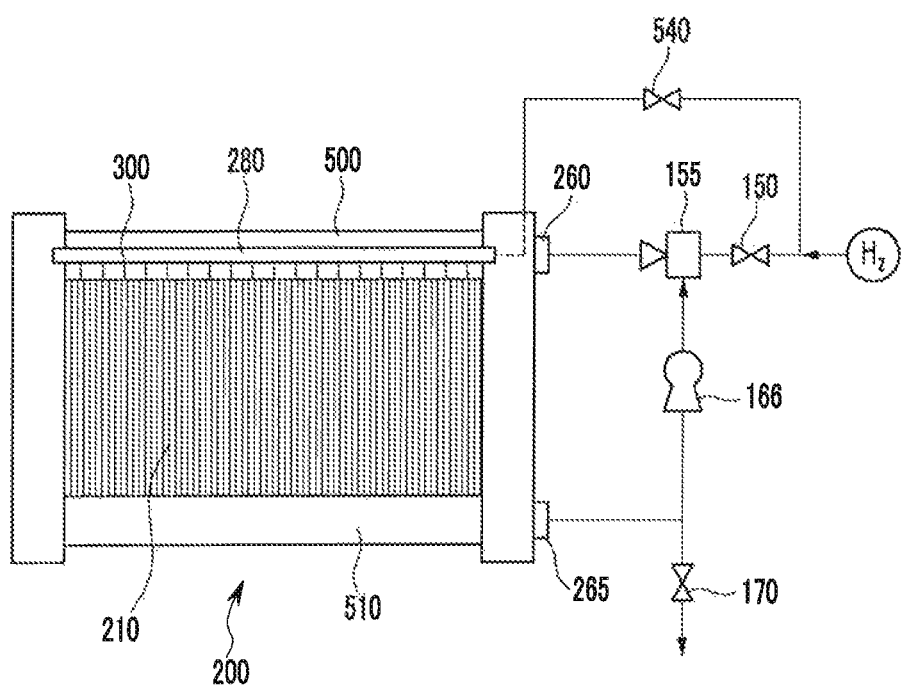
FIG. 5B is a partial schematic diagram of a fuel cell system according to a third exemplary embodiment of the present invention.

One end portion of the injection array 280 that corresponds to the hydrogen inlet 260 may also be connected to the hydrogen injection supply valve 540 to receive separate hydrogen from the hydrogen injection supply valve 540. FIG. 5B is a partial schematic diagram of a fuel cell system according to a third exemplary embodiment of the present invention.

The configuration of FIG. 5B is compared with that of FIG. 5A. The difference between them is a point where a line that supplies the injection array 280 with hydrogen is diverged. As shown in the drawings, a line is diverged at a rear end portion of the hydrogen supply valve 150 in FIG. 5A, and a line is diverged at a front end portion of the hydrogen supply valve 150 in FIG. 5B.

Figure 5C:
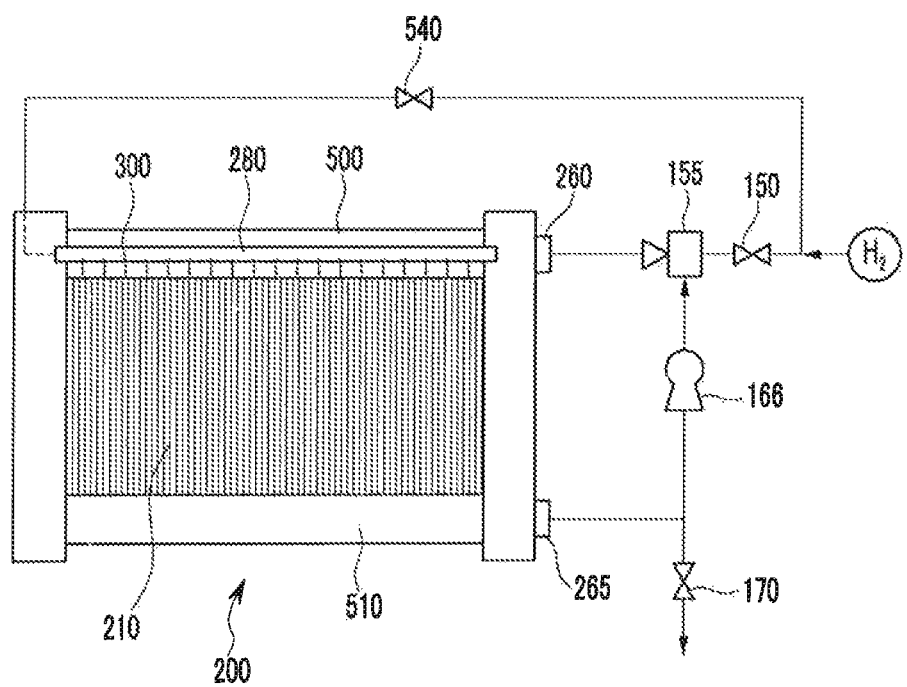
FIG. 5C is a partial schematic diagram of a fuel cell system according to a fourth exemplary embodiment of the present invention.

FIG. 5C is a partial schematic diagram of a fuel cell system according to a fourth exemplary embodiment of the present invention. The configuration of FIG. 5C is compared with that of FIG. 5B. The difference between them is the point where the injection array 280 is connected to the hydrogen injection supply valve 540.

As shown in the drawings, one end portion of the injection array 280 is connected to the hydrogen injection supply valve 540 in FIG. 5B, and the other end portion of the injection array 280 is connected to the hydrogen injection supply valve 540 in FIG. 5C. That is, one end portion of the injection array 280 that corresponds to the hydrogen inlet 260 or the other end portion thereof that corresponds to the opposite side of the hydrogen inlet 260 can receive hydrogen.

Referring to FIGS. 5A, 5B, and 5C, hydrogen gas recirculates through the hydrogen inlet 260, the fuel gas supply manifold 500, the stack portion 210, the fuel gas exhaust manifold 510, and the hydrogen outlet 265 through a hydrogen recirculation blower 166. Here, fresh dry hydrogen gas can he supplied to the injection array 280 instead of recirculated hydrogen.

Figure 6A:
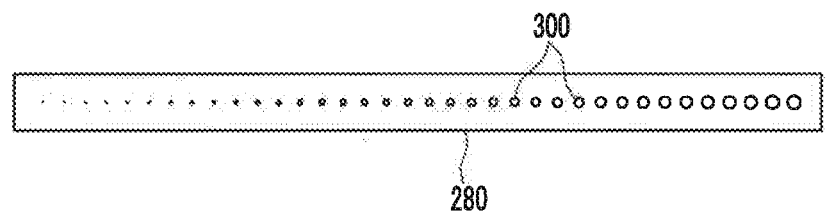
FIG. 6A is a partial schematic diagram of an injection array in a fuel cell system according to a fifth exemplary embodiment of the present invention.
Figure 6B:
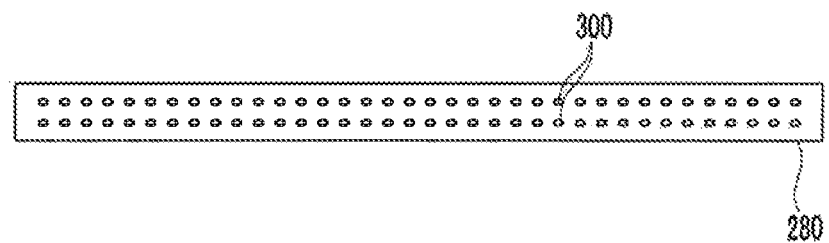
FIG. 6B is a partial schematic diagram of an injection array in a fuel cell system according to a sixth exemplary embodiment of the present invention.
Figure 6C:
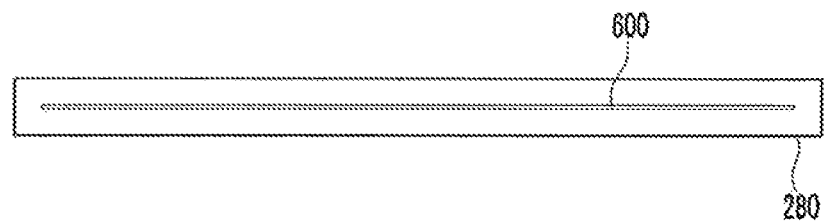
FIG. 6C is a perspective view of an injection array in a fuel cell system according to a seventh exemplary embodiment of the present invention.
Figure 6D:
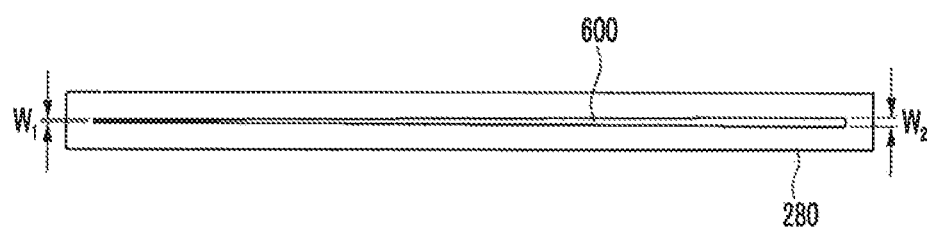
FIG. 6D is a perspective view of an injection array in a fuel cell system according to an eighth exemplary embodiment of the present invention.
Figure 6E:
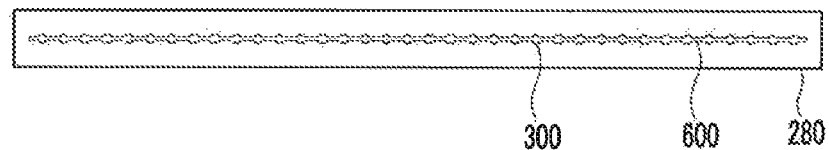
FIG. 6E is a perspective view of an injection array in a fuel cell system according to a ninth exemplary embodiment of the present invention.

FIG. 6A is a partial schematic diagram of an injection array in a fuel cell system according to a fifth exemplary embodiment of the present invention, FIG. 6B is a partial schematic diagram of an injection array in a fuel cell system according to a sixth exemplary embodiment of the present invention, FIG. 6C is a perspective view of an injection array in a fuel cell system according to a seventh exemplary embodiment of the present invention, FIG. 6D is a perspective view of an injection array in a fuel cell system according to an eighth exemplary embodiment of the present invention, and FIG. 6E is a perspective view of an injection array in a fuel cell system according to a ninth exemplary embodiment of the present invention.

Referring to FIG. 6A, the nozzles 300 are arranged on the injection array 280 in a length direction. As shown in the drawing, the size of the nozzles 300 is reduced in a length direction. Accordingly, the amount of air or hydrogen that is injected can be accurately controlled.

Referring to FIG. 6B, the nozzles 300 are arranged on the injection array 280 in two rows in a length direction. Accordingly, air or hydrogen can be injected to a wider area.

Referring to FIGS. 6C and 6D, a slot 600 is continuously formed on the injection array 280 in a length direction. Air or hydrogen can be effectively injected through the slot 600. Further, the width of the slot 600 is reduced from W2 to W1 in FIG. 6D to be able to control the injection amount of air or hydrogen.

Referring to FIG. 6E, the slot 600 is continuously formed on the injection array 280 in a length direction, and the nozzles 300 are also formed together with the slot 600. Accordingly, the amount of air or hydrogen that is injected can be effectively controlled.

Figure 7:
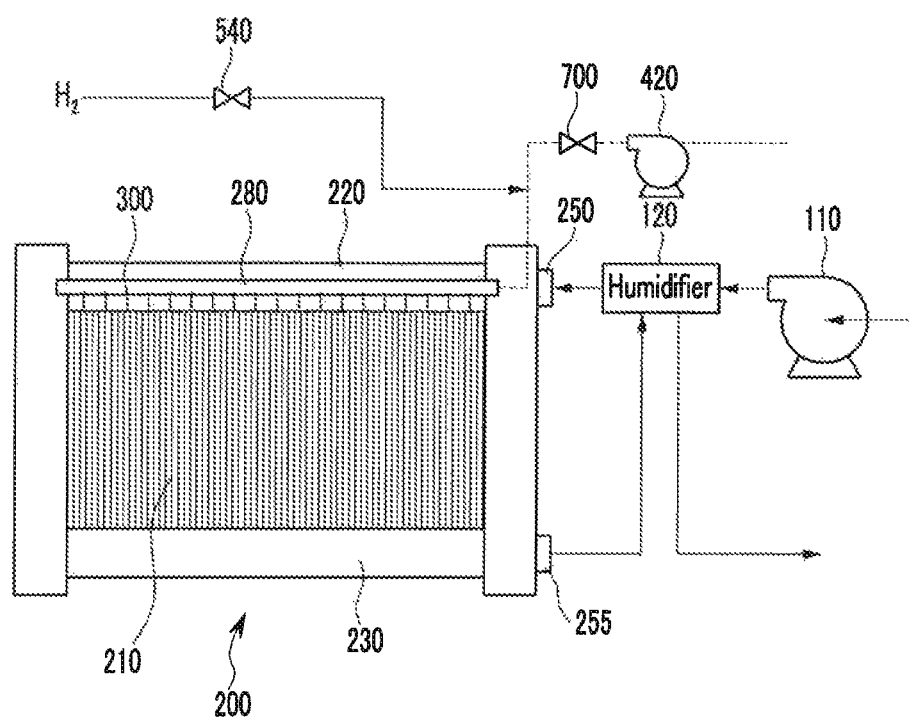
FIG. 7 is a perspective view of an injection array in a fuel cell system according to a tenth exemplary embodiment of the present invention.

FIG. 7 is a perspective view of an injection array in a fuel cell system according to a tenth exemplary embodiment of the present invention. Referring to FIG. 7, a fuel cell system includes a fuel cell 200, a humidifier 120, an air compressor 110, an air injection compressor 420, an air injection supply valve 700, and an hydrogen injection supply valve 540, and the fuel cell 200 includes an air inlet 250, an air supply manifold 220, a stack portion 210, an air exhaust manifold 230, an air outlet 255, and an injection array 280.

Air is supplied to the stack portion 210 through the air compressor 110, the humidifier 120, the air inlet 250, and the air supply manifold 220, and is exhausted to the outside through the air exhaust manifold 230 and the air outlet 255. The injection array 280 is inserted into the air supply manifold 220 through the air inlet 250, and the nozzle 300 of the injection array 280 is disposed to face the cells of the stack portion 210.

One end portion of the injection array 280 that corresponds to the air inlet 250 is connected to the air injection compressor 420 and receives separate air from the air injection compressor 420. That is, air that is recirculated through the humidifier 120 or is newly supplied is often damp or moist, but air that is supplied to the injection array 280 through the air injection supply valve 700 is contrastingly dry.

In an exemplary embodiment of the present invention, the injection array 280 can receive hydrogen through the hydrogen injection supply valve 540. More specifically, one end portion of the injection array 280 may be connected to the hydrogen injection supply valve 540 through a hydrogen line to selectively receive air or hydrogen.

Figure 8:
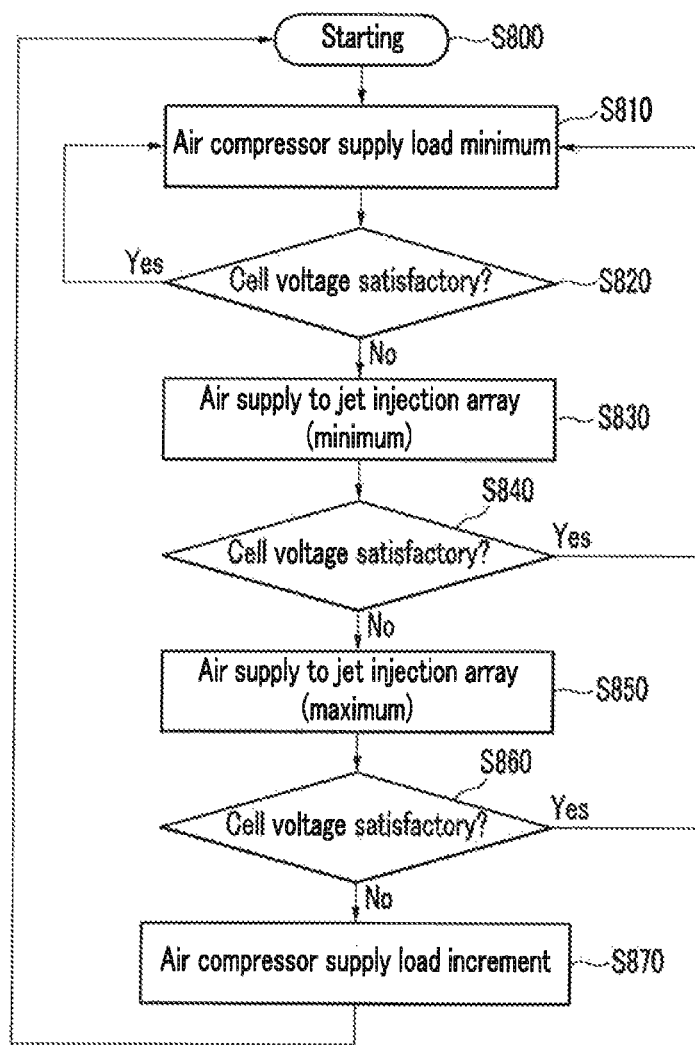
FIG. 8 is a flowchart showing an air supply method in a fuel cell system according to an exemplary embodiment of the present invention.

FIG. 8 is a flowchart showing an air supply method in a fuel cell system according to an exemplary embodiment of the present invention. Referring to FIG. 8 and FIG. 4, a system is started in S800, and the air compressor 110 is operated at a minimum load in S810. The voltage that is generated from each cell of the stack portion 210 is detected in S820, and it is determined by the controller whether the detected voltage of each cell is larger than a predetermined value in S820. If the condition is satisfied, S810 is performed, and if the condition is not satisfied, S830 is performed.

An air supply valve 422 is opened to supply the injection array 280 with a minimum amount of air in S830. At this point, it is determined whether the voltage that is outputted from each cell of the stack portion 210 is satisfied or not in S840. If the condition is satisfied, S810 is performed, and if the condition is not satisfied, S850 is performed.

In S850, a maximum amount of air is supplied to the injection array 280. In response, it is determined whether output voltage of each cell of the stack portion 210 is satisfied or not in S860. If the condition is satisfied, S810 is performed, and if the condition is not satisfied, the air supply load of the air compressor 870 is increased in S870.

Figure 9:
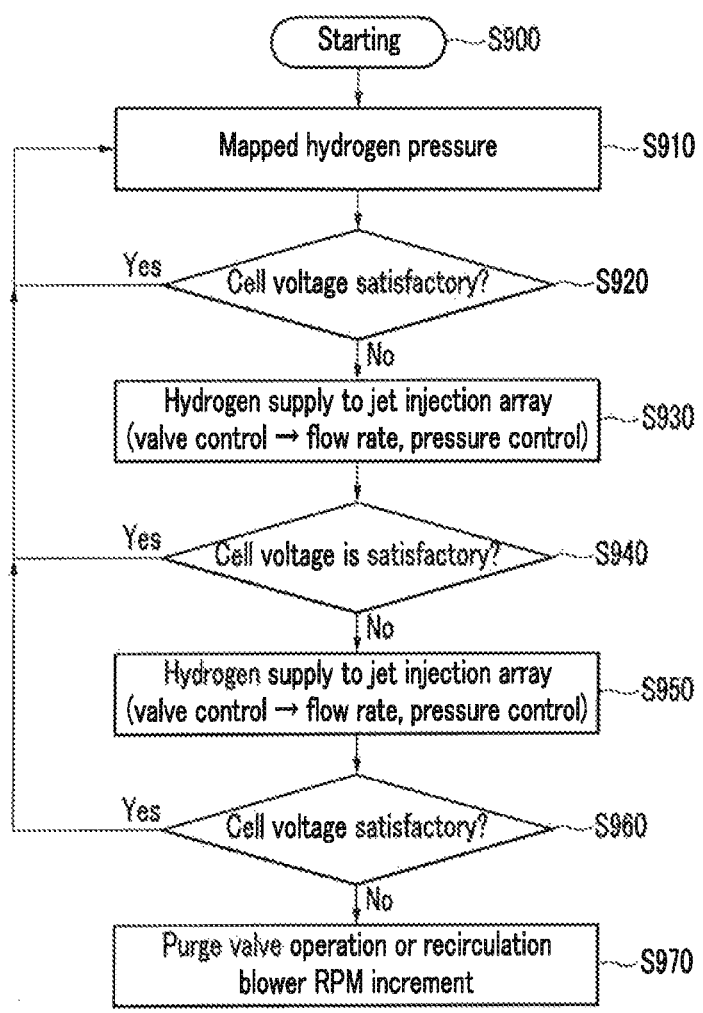
FIG. 9 is a flowchart showing a hydrogen supply method in a fuel cell system according to an exemplary embodiment of the present invention.

FIG. 9 is a flowchart showing a hydrogen supply method in a fuel cell system according to an exemplary embodiment of the present invention. Referring to FIG. 9 and FIG. 5A, FIG. 5B, and FIG. 5C, a system is normally operated in S900. Hydrogen is supplied with a predetermined pressure in S910, and then it is determined whether output voltage of each cell of the stack portion 210 is satisfied or not in S920. If the condition is satisfied, S910 is performed, and if the condition is not satisfied, S930 is performed.

In S930, hydrogen is supplied to the injection array 280. In this process, the flow rate thereof can be controlled by a separate hydrogen injection supply valve 540, and the hydrogen can be supplied in pulses. It is then determined whether output voltage of each cell of the stack portion 210 is satisfied or not in S940. If the condition is satisfied, S910 is performed, and if the condition is not satisfied, S960 is performed.

The controller also determines whether output voltage of each cell of the stack portion 210 is satisfied or not in S960. As a result, if the condition is satisfied, S910 is performed, and if the condition is not satisfied, S970 is performed. In S970, a controller operates the purge valve 170 or increases the rotation speed of a hydrogen recirculation blower. Accordingly, hydrogen is effectively supplied to each cell of the stack portion 210 so that voltage of each cell is uniformly generated.

Figure 10:
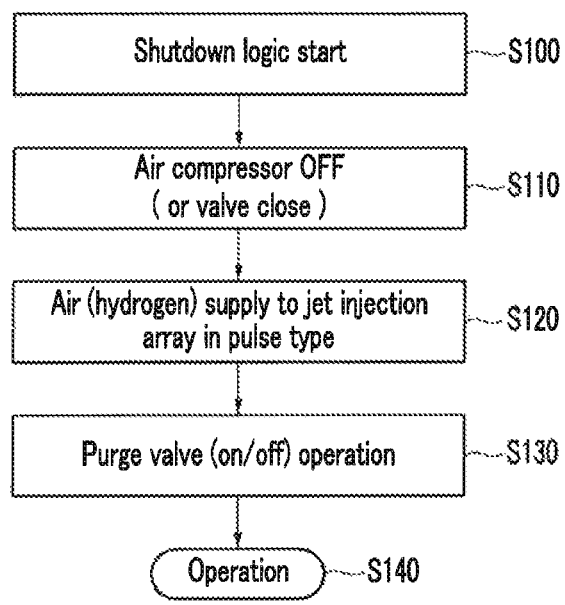
FIG. 10 is a flowchart showing a shutdown logic in a fuel cell system according to an exemplary embodiment of the present invention.

FIG. 10 is a flowchart showing a shutdown control logic in a fuel cell system according to an exemplary embodiment of the present invention. Referring to FIG. 10, FIG. 4, and FIG. 5A, the shut-down logic is performed in S100, and the air compressor is turned off in S110. Air or hydrogen is then supplied to the injection array 280 in pulses in S120, and the purge valve 170 is turned on/off to effectively exhaust water that is generated from the stack portion 210 in S130. Particularly, air or hydrogen that is supplied through the injection array 280 is drier than air or hydrogen that recirculates through the stack portion 210 to be able to eliminate the flooding phenomenon that occurs inside the cell of the stack portion 210.

Also, in a shut-down process of a fuel cell system, the injection array 280 injects hydrogen or air in pulses by increasing/decreasing the operating speed of the air compressor 110 or by on/off operation of a valve that is disposed at an outlet of the air compressor 110. In this process, a strong jet of gas of which relative humidity is low and temperature is low is injected to each cell of the stack portion 210 to be able to exhaust steam and moisture that is formed on the cathode of the stack portion 210.

Further, in an exemplary embodiment of the present invention, the time at which the air compressor 110 is turned off can be determined by using the temperature of an outlet side of the stack portion 210. Also, low temperature and low relative humidity hydrogen is supplied through the injection array without recirculation to be able to exhaust water of the anode during a shut-down process.

In an exemplary embodiment of the present invention, a controller (not shown) controls all operational elements of a fuel cell system. That is, the controller executes a series of programs for performing shut-down logic of a fuel cell system and controls the compressor, the blower, and the valve such that air/fuel gas (hydrogen) that is supplied to the air manifold 220, the hydrogen manifold 500 and the injection array 280 is controlled.

Also, when it is determined that a shut-down process is being performed to turn off the stack portion 210, the controller supplies the injection array that is disposed in the air manifold 220 with dry air that does not pass the humidifier. Also, the controller can supply the injection array 280 that is disposed in the fuel gas manifold 50 with dry fuel gas that does not pass the ejector 155.

Hereinafter, a wakeup process of a fuel cell system will be described.

If it is determined that the fuel cell system is not being operated and the turn-off condition is maintained for a predetermined period or longer, the controller can operate an air cut valve (not shown) so as to prevent outside air from flowing into the stack portion 210. However, as time goes on, the outside air flows into the cathode and the air that is supplied to the cathode penetrates a membrane of each cell of the stack portion 210 to be transferred to the anode. If start-up is performed in this condition, a higher than desirable localized voltage is formed and a graphite carrier is oxidized to be able to deteriorate the performance of the fuel cell. Thus, air that flows into the stack portion has to be delayed as much as possible while a fuel cell is not being operated for a predetermined time or longer In an exemplary embodiment of the present invention, if it is determined that a starting off condition in which the stack portion 210 does not generate voltage is continued for a predetermined period, the controller can supply the injection array 280 that is disposed in the air manifold 220 with a predetermined small amount of hydrogen and can supply the injection array 280 that is disposed in the fuel gas manifold 500 with a predetermined small amount of hydrogen. Thus, if a small amount of hydrogen is supplied to the anode, the hydrogen is transferred through a membrane to eliminate oxygen within the cathode. In this process, the hydrogen supply amount can be determined based on a volume of a channel, a volume of a stack, a volume of a manifold, and a recirculation route.

Further, because a supply valve of a hydrogen tank cannot be opened when a fuel cell vehicle is parked, hydrogen that is in a pipe between a hydrogen tank and a fuel cell 200 can be used. Here, because about 3 to 10 liters of hydrogen can be used according to the design specification of the fuel cell, the hydrogen amount that can be used to purge the anode is limited, and hydrogen can leak to the outside, it is desirable to minimize the purge amount of hydrogen.

Further, hydrogen of the anode reacts with oxygen to be eliminated after a fuel cell system is turned off, water vapor is condensed, pressure of the anode becomes vacuum condition, and therefore outside air flows therein. Accordingly, a small amount of hydrogen is supplied to a channel as a passage of each cell through the injection array 280 while air flows into the stack portion, and therefore overall durability is improved.

Hereinafter, an operating method for starting will be described.

When a vehicle having a fuel cell system is parked for a predetermined time or longer, higher than desirable voltage can be generated during starting, as a result the present invention provides a method for preventing this higher than desirable voltage by directly injecting hydrogen into the cathode through the injection array 280 as described above. That is, hydrogen is instantaneously injected into the cathode of the stack portion 210 through the injection array 280 that is disposed in the air manifold during the starting of the fuel cell system such that the oxygen concentration of the cathode is reduced to prevent the high voltage.

In an exemplary embodiment of the present invention, a small amount of hydrogen is injected into the channel of the cathode before the air compressor is operated during the starting, and therefore the hydrogen prevents the high voltage and the durability of the stack portion is improved.

In an exemplary embodiment of the present invention, the injection array 280 is disposed in the manifold of the stack portion 210, the supply amount of air or hydrogen is increased by the array 280 to stabilize each cell of the stack portion, and as the length of the stack portion 210 of the fuel cell 200 becomes longer, flow deviations between cells are increased, but the injection array 280 can reduce the deviations.

Also, the load on the air compressor 110 and the hydrogen recirculation blower can be reduced by reducing a fluctuation width of the stoichiometry for increasing air supply or hydrogen supply. Resultantly, parasitic power loss and capacity of the humidifier and pipe can be reduced to save cost.

In the fuel cell system, the high voltage air compressor 100 (or blower) is used to supply air, and if the rotation speed (RPM) of the compressor 100 is increased so as to increase the air supply amount in a high power area, power consumption is increased to deteriorate the efficiency of the fuel cell system, and maximum output of the fuel cell can be restricted by the limit of the compressor or the recirculation blower.

However, although the load on the air compressor or the recirculation blower is maintained at an equal level, supply efficiency of air/fuel gas is improved and the efficiency of the fuel cell can be improved in a high power area. Accordingly, there are merits that a recirculation blower or an air compressor can be smaller, the size of a humidifier can be reduced, the humidifying performance can be improved, and the configuration of piping can be improved. Also, the capacity of components such as intercooler can be reduced or eliminated by avoiding unnecessary charging and high pressure operation.

Further, as stated above, starting a vehicle causes difficulties for fuel cells in a low temperature condition. The condition of the inside of the stack portion may influence the starting time, the starting characteristics, and the durability. Particularly, water vapor and water that is formed after the starting cause decisive effects of cold starting, in short, the less water (ice) there is, the better the cold starting of the stack portion or the characteristics of the related device (BOP) becomes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of Symbols> | |
|---|---|
| 100: filter | 105: muffler |
| 110: air compressor | 115: intercooler |
| 120: humidifier | 130: cathode |
| 135: exhaust valve | 150: hydrogen supply valve |
| 155: ejector | 160: anode |
| 165: reservoir | 170: purge valve |
| 175: drain valve | 180: cooling channel |
| 185: coolant reservoir | 190: radiator |
| 195: 3-way valve | 197: water pump |
| 200: fuel cell | 210: stack portion |
| 220: air supply manifold | 230: air exhaust manifold |
| 250: air inlet | 255: air outlet |
| 260: hydrogen inlet | 265: hydrogen outlet |
| 270: coolant inlet | 275: coolant outlet |
| 280: injection array | 300: nozzle |
| 420: air injection compressor | 500: fuel gas supply manifold |
| 510: fuel gas exhaust manifold | 540: hydrogen injection supply valve |
| 600: slot | 700: air injection supply valve |

What is claimed is:

1. A fuel cell system, comprising:
   an air manifold through which air is supplied or exhausted;
   a fuel gas manifold through which fuel gas is supplied or exhausted;
   a stack of cells that generate electricity by using air and fuel that are supplied through the air manifold and the fuel gas manifold; and
   an injection array that is disposed along an inside of the air manifold or the fuel gas manifold,
   wherein the injection array has a pipe structure and is inserted into the air manifold or the fuel gas manifold, and
   wherein a nozzle is formed at a side of the injection array to inject air or fuel gas, respectively.

2. The fuel cell system of claim 1, wherein nozzles of the injection array have a predetermined shape and are arranged with a predetermined distance therebetween.

3. The fuel cell system of claim 1, wherein air is supplied through an inlet of the air manifold, and the air is supplied through the injection array.

4. The fuel cell system of claim 1, wherein the injection array is inserted into the fuel gas manifold, fuel gas is supplied through an inlet of the fuel gas manifold, and the fuel gas is supplied through the injection array.

5. The fuel cell system of claim 1, wherein fuel gas or air is supplied through one end portion of the injection array.

6. The fuel cell system of claim 5, wherein fuel gas or air is supplied through different end portion of the injection array.

7. The fuel cell system of claim 1, wherein nozzles of the injection array are arranged in at least two rows.

8. The fuel cell system of claim 1, wherein a nozzle of the injection array has a slot shape that is continuously formed in a length direction.

9. A fuel cell system, comprising:
   an air manifold through which air is supplied or exhausted;
   a fuel gas manifold through which fuel gas is supplied or exhausted;
   a cell stack that is configured to generate electricity by using air and fuel gas that are supplied from the air manifold and the fuel gas manifold;
   an injection array that is disposed along an inside of the air manifold or the fuel gas manifold; and
   a controller configured to control the operation of the cell stack and controls air or fuel gas that is supplied through the air manifold, the fuel gas manifold, and the injection array,
   wherein the injection array has a pipe structure and is inserted into the air manifold or the fuel gas manifold, and
   wherein a nozzle is formed at a side of the injection array to inject air or fuel gas, respectively.

10. The fuel cell system of claim 9, wherein the controller supplies the injection array that is disposed in the air manifold with dry air that does not pass through a humidifier and supplies the injection array that is disposed in the fuel gas manifold with dry fuel gas that does not pass an ejector if a shut-down process is being performed to stop the operation of the stack portion.

11. The fuel cell system of claim 9, wherein the controller supplies the injection array that is disposed in the fuel gas manifold with a predetermined amount of hydrogen, if it is determined that the stack portion maintains a starting off condition in which a voltage is not generated for a predetermined time.

12. The fuel cell system of claim 9, wherein the controller supplies the injection array that is disposed in the air manifold with a predetermined amount of hydrogen, when a starting signal is detected while the vehicle is currently off and the stack is not generating electricity.

* * * * *